US008725758B2

(12) United States Patent
Rakshit (10) Patent No.: US 8,725,758 B2
(45) Date of Patent: May 13, 2014

(54) VIDEO TAG SHARING METHOD AND SYSTEM

(75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/949,973

(22) Filed: Nov. 19, 2010

(65) Prior Publication Data

US 2012/0131002 A1  May 24, 2012

(51) Int. Cl.
*G06F 7/00* (2006.01)
*G06F 17/30* (2006.01)

(52) U.S. Cl.
USPC ............. 707/769; 725/25; 725/46; 725/87; 725/115

(58) Field of Classification Search
None
See application file for complete search history.

(56) References Cited

U.S. PATENT DOCUMENTS

| | | | |
|---|---|---|---|
| 7,111,018 B1 | 9/2006 | Goodrich et al. | |
| 2008/0098313 A1* | 4/2008 | Pollack | 715/753 |
| 2008/0134035 A1* | 6/2008 | Pennington et al. | 715/713 |
| 2008/0155625 A1 | 6/2008 | Liwerant et al. | |
| 2008/0163321 A1* | 7/2008 | Liwerant et al. | 725/112 |
| 2008/0178230 A1 | 7/2008 | Eyal et al. | |
| 2008/0184119 A1* | 7/2008 | Eyal et al. | 715/719 |
| 2009/0019487 A1* | 1/2009 | Kulas | 725/41 |
| 2009/0044216 A1 | 2/2009 | McNicoll | |
| 2009/0100339 A1 | 4/2009 | Wharton-Ali et al. | |
| 2009/0187579 A1 | 7/2009 | Brancaccio et al. | |
| 2009/0199230 A1* | 8/2009 | Kumar et al. | 725/32 |
| 2009/0217329 A1* | 8/2009 | Riedl et al. | 725/93 |
| 2009/0281674 A1 | 11/2009 | Taft | |
| 2009/0313546 A1* | 12/2009 | Katpelly et al. | 715/723 |
| 2010/0095329 A1 | 4/2010 | Tran et al. | |
| 2010/0169906 A1* | 7/2010 | Takahashi | 725/13 |
| 2010/0241963 A1* | 9/2010 | Kulis et al. | 715/727 |
| 2010/0306257 A1* | 12/2010 | Levy | 707/770 |
| 2011/0107379 A1* | 5/2011 | Lajoie et al. | 725/87 |
| 2011/0119637 A1* | 5/2011 | Tuli et al. | 715/863 |
| 2011/0161348 A1* | 6/2011 | Oron | 707/769 |

OTHER PUBLICATIONS

Ha, Anthony, Former Facebook exec backs BlipSnips social video service; Jan. 24, 2011; http://venturebeat.com/2011/01/24/blipsnips-chris-kelly/; retrieved from Internet on Sep. 12, 2011.
Unknown, BlipSnips: Tag & Share Specific Parts of Video; http://www.makeusof.com/dir/blipsnips-share-part-oa-a-youtube-video/; retrieved from Internet on Sep. 12, 2011.
Santos, R. L., Rocha, B. P., Rezende, C. G., & Loureiro, A. A. (May 2007). Characterizing the YouTube video-sharing community, (Technical report). Retrieved from http://security1.win.tue.nl/~bpontes/pdf/yt.pdf.

* cited by examiner

*Primary Examiner* — Dung K Chau (74) *Attorney, Agent, or Firm* — Schmeiser, Olsen & Watts; John Pivnichny (57) ABSTRACT

A tag sharing method and system. The method includes receiving by a computer processor, an audio/video data file and tag data describing different subject matter of audio/video data of the audio/video data file. The computer processor associates portions of the tag data with audio/video subsets of the audio/video data and in response the computer processor generates a modified audio/video data file including independent audio/video tags. Each audio/video tag of the independent audio/video tags includes an audio/video subset of the audio/video subsets independently stored with an associated portion of the portions of the tag data. The computer processor receives rule data comprising rules associated with allowing users of a social networking system to view each audio/video subset. The computer processor stores the modified audio/video data file and the rule data.

20 Claims, 5 Drawing Sheets

VIDEO TAG SHARING METHOD AND SYSTEM

FIELD OF THE INVENTION

The present invention relates to a method and associated system for sharing portions of audio/video data files.

BACKGROUND OF THE INVENTION

Dividing data between parties typically comprises an inefficient process with little flexibility. Accordingly, there exists a need in the art to overcome the deficiencies and limitations described herein above.

SUMMARY OF THE INVENTION

The present invention provides a method comprising: receiving, by a computer processor of a computing system, an audio/video data file; receiving, by the computer processor, tag data describing different subject matter of audio/video data of the audio/video data file; associating, by the computer processor, portions of the tag data with audio/video subsets of the audio/video data; generating, by the computer processor, a modified audio/video data file comprising independent audio/video tags, wherein each audio/video tag of the independent audio/video tags comprises an audio/video subset of the audio/video subsets independently stored with an associated portion of the portions of the tag data; receiving, by the computer processor, rule data comprising rules associated with allowing users of a social networking system to view each the audio/video subset; associating, by the computer processor, the rule data with said independent audio/video tags; and storing, by the computer processor, the modified audio/video data file and the rule data.

The present invention provides a computer program product, comprising a computer readable storage medium having a computer readable program code embodied therein, the computer readable program code comprising an algorithm that when executed by a computer processor of a computing system implements a method comprising: receiving, by the computer processor, an audio/video data file; receiving, by the computer processor, tag data describing different subject matter of audio/video data of the audio/video data file; associating, by the computer processor, portions of the tag data with audio/video subsets of the audio/video data; generating, by the computer processor, a modified audio/video data file comprising independent audio/video tags, wherein each audio/video tag of the independent audio/video tags comprises an audio/video subset of the audio/video subsets independently stored with an associated portion of the portions of the tag data; receiving, by the computer processor, rule data comprising rules associated with allowing users of a social networking system to view each the audio/video subset; associating, by said computer processor, said rule data with said independent audio/video tags; and storing, by the computer processor, the modified audio/video data file and the rule data.

The present invention provides a computing system comprising a computer processor coupled to a computer-readable memory unit, the memory unit comprising instructions that when executed by the computer processor implements a method comprising: receiving, by the computer processor, an audio/video data file; receiving, by the computer processor, tag data describing different subject matter of audio/video data of the audio/video data file; associating, by the computer processor, portions of the tag data with audio/video subsets of the audio/video data; generating, by the computer processor, a modified audio/video data file comprising independent audio/video tags, wherein each audio/video tag of the independent audio/video tags comprises an audio/video subset of the audio/video subsets independently stored with an associated portion of the portions of the tag data; receiving, by the computer processor, rule data comprising rules associated with allowing users of a social networking system to view each the audio/video subset; associating, by said computer processor, said rule data with said independent audio/video tags; and storing, by the computer processor, the modified audio/video data file and the rule data.

The present invention advantageously provides a simple method and associated system capable of dividing data between parties.

DETAILED DESCRIPTION OF THE INVENTION

Figure 1:
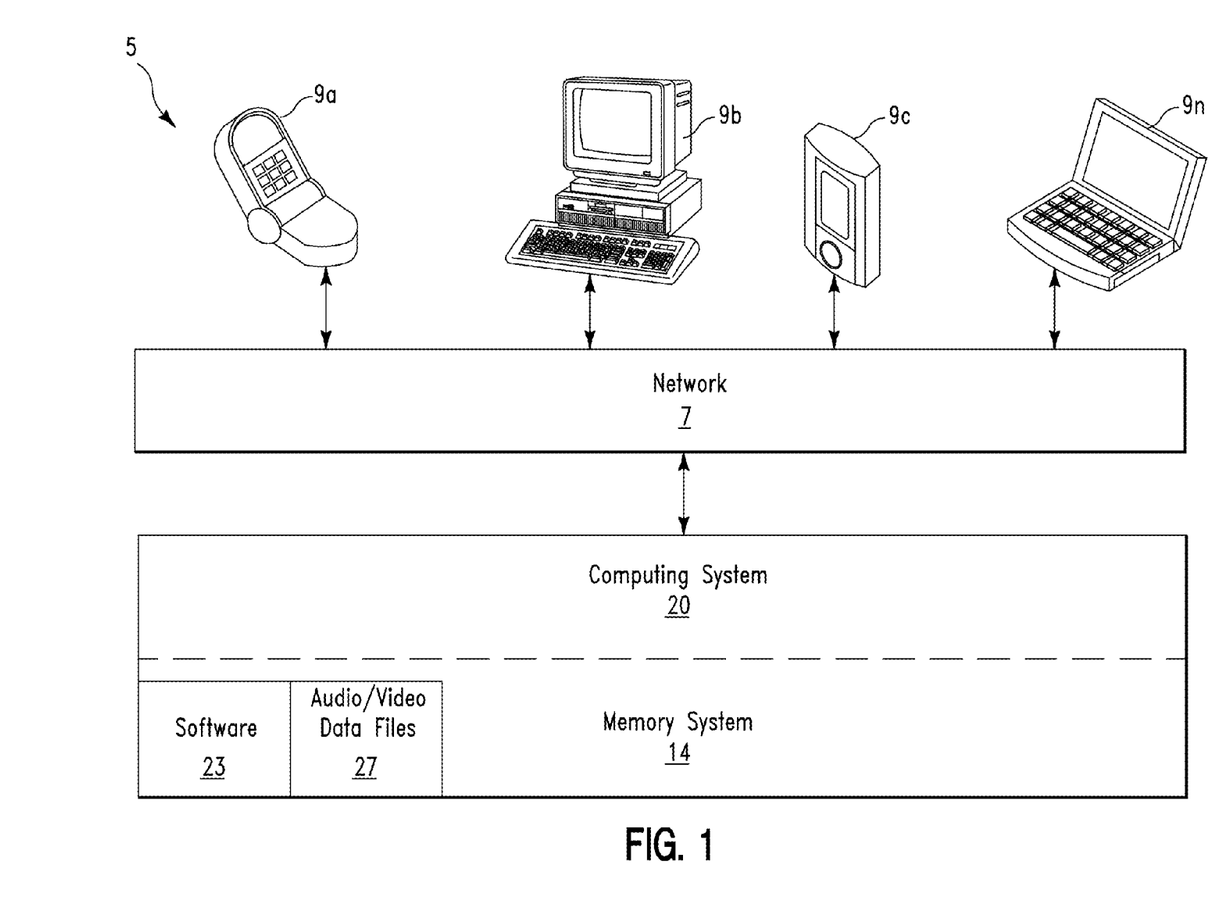
FIG. 1 illustrates a system for sharing portions of audio/video data files with different parties of a social networking system, in accordance with embodiments of the present invention.

FIG. 1 illustrates a system 5 for sharing portions of audio/video data files with different parties of a social networking system, in accordance with embodiments of the present invention. A social network system is defined herein as an online service, platform, or Website that focuses on building and reflecting social relations among people that share similar interests and/or activities. System 5 enables:

1. A user to enable a specific portion of a video file (e.g. one scene from a movie).
2. A user (i.e., a video provider) to share a specific portion of a video file (e.g. the user elects to share only one scene from a movie) with users in social networking system.
3. A user (i.e., a user retrieving videos) to retrieve only a particular portion of a video file (e.g., a scene in a movie).
4. A user (i.e., a video provider) to share a summary of a video file with users in social networking system.
5. A user (i.e., a video provider) to share a playlist comprising particular portions of a video file with users in social networking system.
6. A user (i.e., a video provider) to provide a location based partial video content sharing process with users in social networking system.
7. A user (i.e., a video provider) to provide a time based video sharing process with users in social networking system.

System 5 allows users (in social networking system) to share specific portions of a video file by assigning tags to each portion and sharing an associated tag (i.e., comprising an associated portion of the video file). Therefore, only tagged portions are shared. Users may define different rules while sharing a specific video tag.

System 5 of FIG. 1 comprises devices 9a . . . 9n connected through a network 7 to a computing system 20. Alternatively, devices 9a . . . 9n may be directly connected to computing system 20 (i.e., without network 7). Devices 9a . . . 9n comprise any type of audio/video playback/broadcasting device such as, inter alia, a computer, a PDA, a laptop computer, a tablet computer, a cellular telephone, etc. Network 7 may comprise any type of network including, inter alia, a telephone network, a local area network, (LAN), a wide area network (WAN), the Internet, a wireless network, etc. Computing system 20 may comprise any type of computing system(s) including, inter alia, a computer (PC), a server computer, a database computer, a controller, etc. Computing system 20 comprises a memory system 14. Memory system 14 may comprise a single memory system. Alternatively, memory system 14 may comprise a plurality of memory systems. Memory system 14 comprises a software application 18 for enabling a process for sharing portions of audio/video data files 27 with different parties of a social networking system as follows:

1. An audio/video data file is divided into portions (e.g., by an editor or user of a video based on different content of the audio/video data file) and each portion is assigned a predefined tag such that each predefined tag includes an associated portion of the audio/video data file. Therefore, each predefined tag is a subset of the audio/video data file.
2. Rules associated with sharing the video portions are defined (e.g., by an editor or user of a video) for each predefined tag. For example, rules may be associated with: a login ID of a viewer, an age group of a viewer, a location of a viewer, a date and time, user name of a viewer, etc. The rules may be stored as metadata comprised by the audio/video data file. Alternatively, the rules may be stored in video publishing software (e.g., software 23).
3. A user shares the predefined tags with users of a social networking system. When a social networking user elects to view a video, rules are retrieved and associated with the social networking user. Based on the rules and the social networking an associated portion of the audio/video data file (comprised by a selected predefined tag) is presented to or downloaded by the social networking user.

Figure 2:
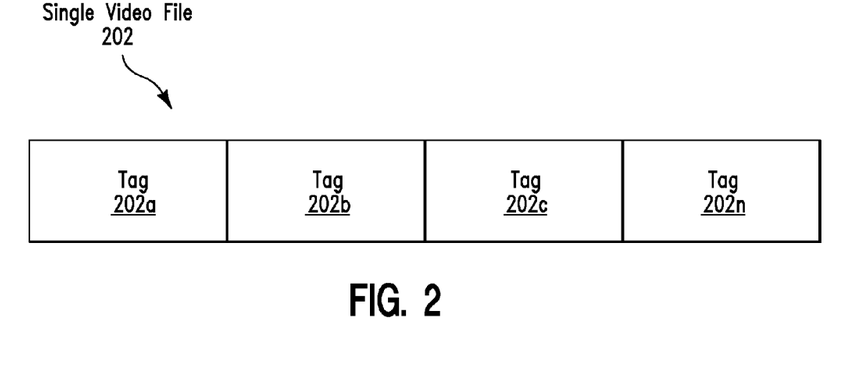
FIG. 2 illustrates a single video data file divided into predefined video tags each comprising a portion of single video data file, in accordance with embodiments of the present invention

FIG. 2 illustrates a single video data file 202 divided into predefined video tags 202a . . . 202n each comprising a portion of single video data file 202, in accordance with embodiments of the present invention. Each of predefined video tags 202a . . . 202n is a subset of single video data file 202. A user may elect to share only some of predefined video tags 202a . . . 202n with users of a social networking system. Additionally, each of predefined video tags 202a . . . 202n may be divided into multiple sub tags each comprising a portion of said predefined video tags 202a . . . 202n. Each of predefined video tags 202a . . . 202n may be tagged based on a location based tagged sharing rule (e.g., a location may be identified based on an IP address or GPS data associated with a user of the social networking system) or any of the following rules:

1. Location based tag sharing rule—A user A shares tag 202a (comprising a comedy portion of a video) and tag 202b (comprising an action portion of a video) with a user B and based on a rule, the user B may: view tag 202a when at a location A and view tag 202b and tag 202c when at a location B.
2. Person based tag sharing rule—A user A shares tag 202a (comprising a comedy portion of a video) with a user B and tag 202n (comprising a drama portion of a video) with a user C.
3. Time based tag sharing rule—A user D may have a specified time period for viewing tag 202c (comprising a romantic portion of a video). After the specified time period has passed, the user D may only access the entire single video file 202.
4. Summary based tag sharing rule—A publisher (of single video file 202) may share only a summary portion for single video file 202 and/or one of predefined video tags 202a . . . 202n.
5. Availability based tag sharing rule—A social networking user may only download an available one of predefined video tags 202a . . . 202n.
6. Age based tag sharing rule—A publisher (of single video file 202) may share only any of predefined video tags 202a . . . 202n based on an age of a social networking user.
7. Video navigation based tag sharing rule—A publisher (of single video file 202) define a specified sequence of presenting predefined video tags 202a . . . 202n.

Figure 3:
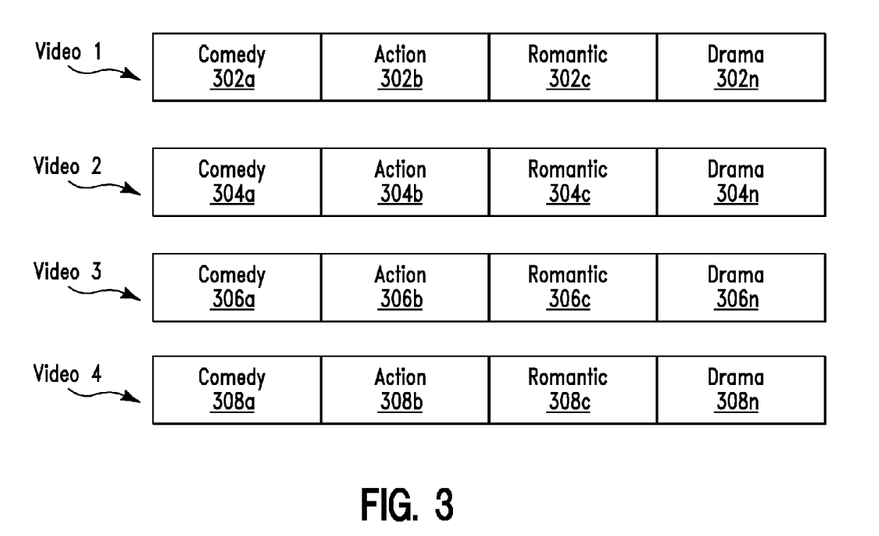
FIG. 3 illustrates an example scenario associated with sharing multiple tagged videos with social networking users, in accordance with embodiments of the present invention.

FIG. 3 illustrates an example scenario associated with sharing multiple divided and tagged videos with social networking users, in accordance with embodiments of the present invention. The scenario illustrated in FIG. 3 describes four different (divided) video files: video 1, video 2, video 3, and video 4. Video 1 comprises: a comedy video tag 302a comprising a comedy portion of video 1, an action tag 302b comprising an action portion of video 1, a romantic tag 302c comprising a romantic portion of video 1, and a drama tag 302n comprising a drama portion of video 1. Video 2 comprises: a comedy video tag 304a comprising a comedy portion of video 2, an action tag 304b comprising an action portion of video 2, a romantic tag 304c comprising a romantic portion of video 2, and a drama tag 304n comprising a drama portion of video 2. Video 3 comprises: a comedy video tag 306a comprising a comedy portion of video 3, an action tag 306b comprising an action portion of video 3, a romantic tag 306c comprising a romantic portion of video 3, and a drama tag 306n comprising a drama portion of video 3. Video 4 comprises: a comedy video tag 308a comprising a comedy portion of video 4, an action tag 308b comprising an action portion of video 4, a romantic tag 308c comprising a romantic portion of video 4, and a drama tag 308n comprising a drama portion of video 4.

The following chart 1 describes an implementation example for sharing tags 302a . . . 302n, 304a . . . 304n, 306a . . . 306n, 308a . . . 308n of video 1, video 2, video 3, and video 4 based of date and time based rules.

TABLE 1

| | 6:00 am-11:59 am | 12:00 pm-5:59 pm | 6:00 pm-12:00 am |
|---|---|---|---|
| Shared video content through Aug. 19, 2010 | Comedy tags 302a . . . 308a are shared with user A and sequenced as follows: 302a $1^{st}$, 304a $2^{nd}$, 306a $3^{rd}$, 308a $4^{th}$. | Romantic tag 302c, romantic tag 304c, drama tag 304n, action tag 306b, and action tag 308b is shared with user B. | Comedy tags 302a . . . 308a and action tags 302b . . . 308b are shared with user A and sequenced as follows: 302a . . . 308a and 302b . . . 308b. |
| Shared video | User may only | User may only | User may only |

TABLE 1-continued

| | 6:00 am-11:59 am | 12:00 pm-5:59 pm | 6:00 pm-12:00 am |
|---|---|---|---|
| content after Aug. 19, 2010 | view entire video 1 and video 4. | view a summary of video 1 and entire video 3 and video 4. | view a summary of video 4. |

Figure 4:
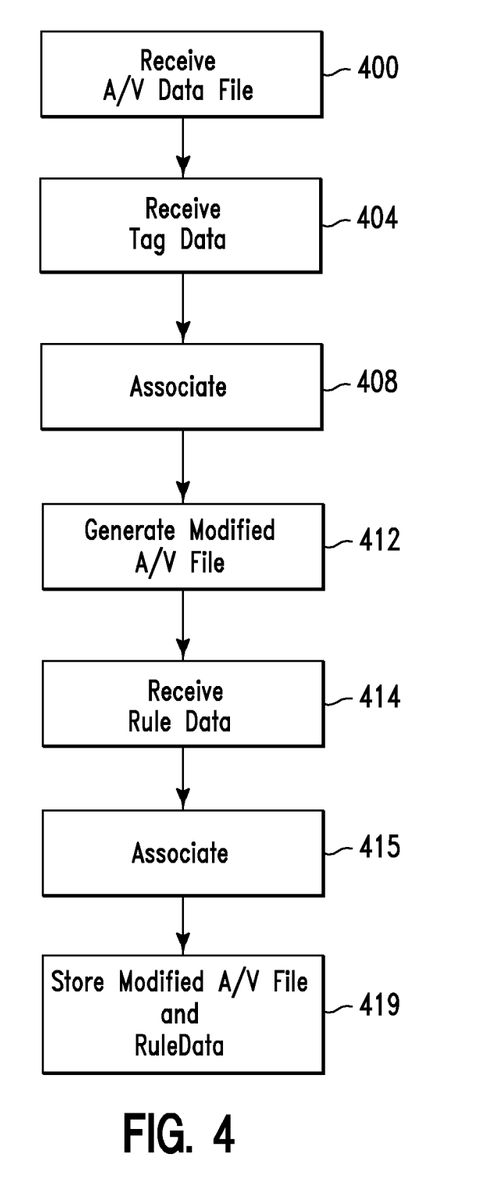
FIG. 4 illustrates an algorithm used by the system of FIG. 1 for implementing a process for dividing a single audio/video data file into predefined audio/video tags, in accordance with embodiments of the present invention.

FIG. 4 illustrates an algorithm used by system 5 of FIG. 1 for implementing a process for dividing a single audio/video data file into predefined audio/video tags each comprising a portion of the single audio/video data file, in accordance with embodiments of the present invention. In step 400, a computer processor (i.e., of a computing system such as, inter alia, computing system 20 of FIG. 1) receives an audio/video data file comprising audio data and video data (e.g., a movie, a video presentation, etc). In step 404, the computer processor receives tag data describing different subject matter of audio/video data of the audio/video data file. In step 408, the computer processor associates portions of the tag data with audio/video subsets of the audio/video data. In step 412, the computer processor generates a modified audio/video data file that includes independent audio/video tags (i.e., as illustrated in FIGS. 2 and 3). Each audio/video tag includes an audio/video subset (of the audio/video subsets) independently stored with an associated portion of the tag data. In step 414, the computer processor receives rule data including rules associated with allowing users of a social networking system to view each audio/video subset. In step 415, the computer processor associates the rule data with the independent audio/video tags. In step 419, the computer processor stores the modified audio/video data file and the rule data.

Figure 5:
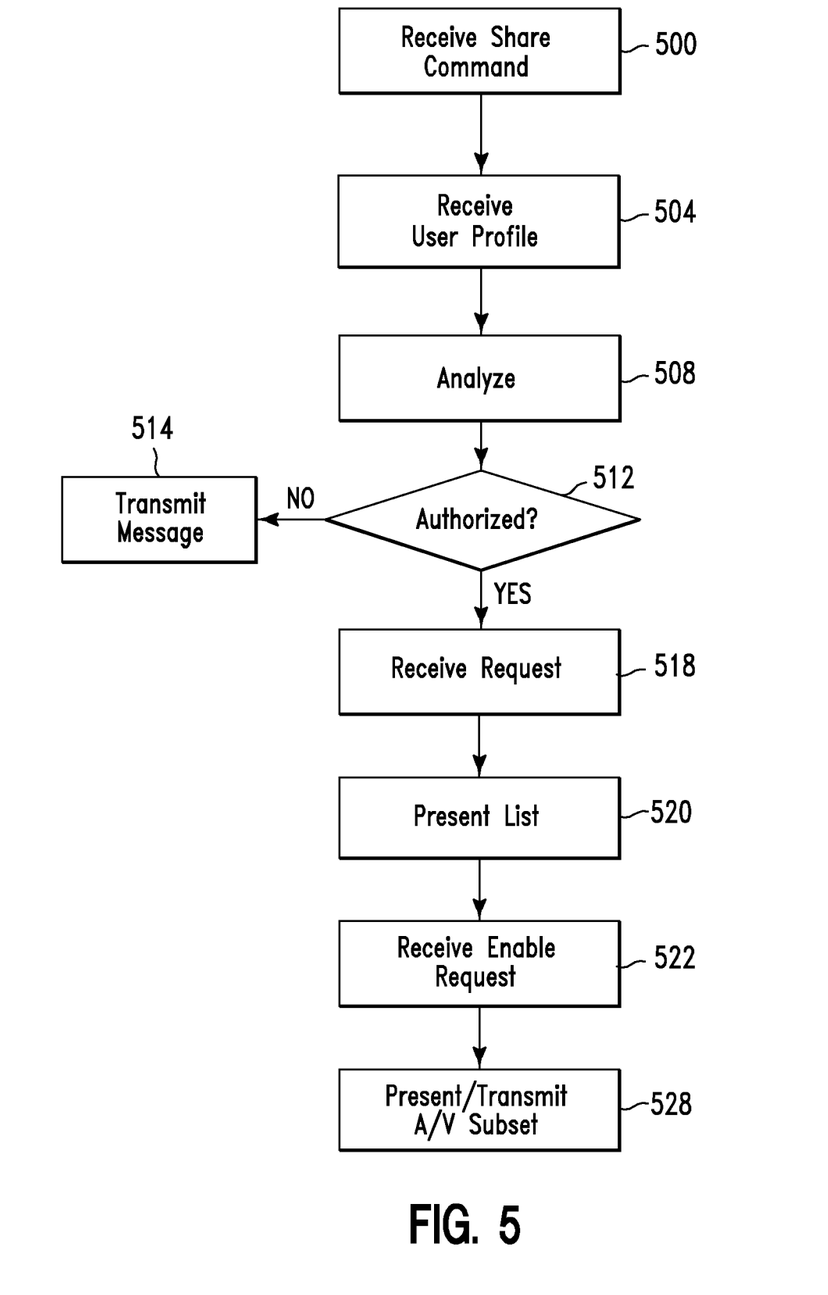
FIG. 5 illustrates an algorithm used by the system of FIG. 1 for implementing a process for sharing audio/video tags, in accordance with embodiments of the present invention.

FIG. 5 illustrates an algorithm used by the system of FIG. 1 for implementing a process for sharing the audio/video tags generated by the process of FIG. 4, in accordance with embodiments of the present invention. The audio/video tags are shared with a social networking system. In step 500, a computer processor (i.e., of a computing system such as, inter alia, computing system 20 of FIG. 1) receives (from a user accessing a device) a command for sharing specified audio/video subsets (of the independent audio/video tags) with social networking users of a social networking system. In step 504, the computer processor retrieves (from the device) a user profile associated with the user. In step 508, the computer processor analyzes the user profile with respect to the command for sharing the specified audio/video subsets, the independent audio/video tags, and the rule data. In step 512, the computer processor determines (based on results of the analyses in step 508) if the user is authorized to share the specified audio/video subsets with the social networking users of the social networking system. If in step 512, the computer processor determines that the user is not authorized to share the specified audio/video subsets with the social networking users of the social networking system then in step 514. a message indicating that the user is not authorized is sent to the user. If in step 512, the computer processor determines that the user is authorized to share the specified audio/video subsets with the social networking users of the social networking system then in step 518, the computer processor receives (from a social networking user of the social networking user) a request for viewing a listing of the independent audio/video tags. In step 520, the computer processor presents (to the social networking user in response to the request) the listing of the independent audio/video tags. In step 522, the computer processor receives from the social networking user a request for enabling a first independent audio/video tag (of the independent audio/video tags). In step 524, computer processor presents or transmits for/to the social networking user) a first audio/video subset of the audio/video subsets.

Figure 6:
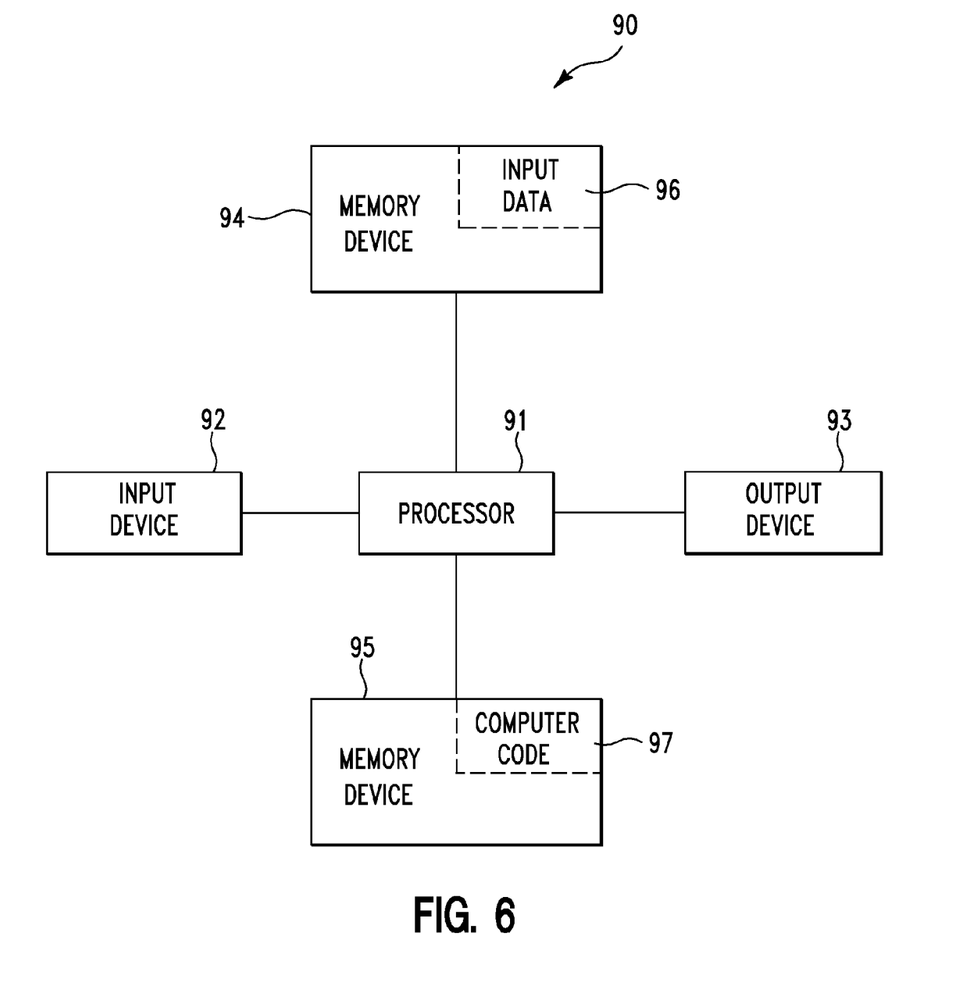
FIG. 6 illustrates a computer apparatus used for sharing portions of audio/video data files with different parties of a social networking system, in accordance with embodiments of the present invention.

FIG. 6 illustrates a computer apparatus 90 (e.g., computing system 20 of FIG. 1) used for sharing portions of audio/video data files with different parties of a social networking system, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 4 and 5) for sharing portions of audio/video data files with different parties of a social networking system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 4 and 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to share portions of audio/video data files with different parties of a social networking system. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for sharing portions of audio/video data files with different parties of a social networking system. In another embodiment, the invention provides a method that performs the process steps of the invention on a subscription, advertising, and/or fee basis. That is, a service provider, such as a Solution Integrator, could offer to share portions of audio/video data files with different parties of a social networking system. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computer processor of a computing system, an audio/video data file;
receiving, by said computer processor, tag data describing different subject matter of audio/video data of said audio/video data file;
associating, by said computer processor, portions of said tag data with audio/video subsets of said audio/video data;
generating, by said computer processor, a modified audio/video data file comprising independent audio/video tags derived from said tag data, wherein each audio/video tag of said independent audio/video tags comprises an audio/video subset of said audio/video subsets independently stored with an associated portion of said portions of said tag data, and wherein each audio/video subset is associated with different subject matter of a single audio/video file of said audio/video data, wherein each said different subject matter comprises subject matter associated with comedy video subject matter, action video subject matter, romantic video subject matter, or drama video subject matter;
dividing, by said computer processor, each said audio/video tag into multiple sub tags, wherein each sub tag of said multiple sub tags comprises an associated portion of said independent audio/video tags;
receiving, by said computer processor, rule data comprising rules associated with allowing users of a social networking system to view each said audio/video subset, said rule data comprising time and date based rules and subject matter based rules;
associating, by said computer processor, said rule data with said independent audio/video tags;
storing, by said computer processor, said modified audio/video data file, said multiple sub tags, and said rule data;
determining, by said computer processor based on said rules, a schedule for sharing said independent audio/video tags with different users of said social networking system based on specified dates, specified time periods, and specified subject matter of each said different subject matter, wherein said specified dates comprise a set of dates occurring prior to a specified date and a set of dates occurring after said specified dates;
sharing, by said computer processor with said social networking system, specified audio/video tags of said independent audio/video tags and specified sub tags of said multiple sub tags;
receiving, by said computer processor from a user of said social networking system, a request for audio/video;
analyzing, by said computer processor, said rules with respect to said modified audio/video data file, said multiple sub tags, and said rule data;
analyzing, by said computer processor, said schedule; and
transmitting, by said computer processor to said user in response to results of said analyzing said rules and said analyzing said schedule, an audio/video subset of said audio/video subsets and a sub tag of said multiple sub tags.

2. The method of claim 1, further comprising:
receiving, by said computer processor from a first user accessing a first device, a command for enabling said modified audio/video data file, wherein said first user is associated with said social networking system;
retrieving, by said computer processor from said first device, a first user profile associated with said first user;
first analyzing, by said computer processor, said first user profile with respect to said independent audio/video tags and said rule data; and
transmitting, by said computer processor to said first user via said first device in response to results of said first analyzing, a first audio/video subset of said audio/video subsets, wherein said first device presents said first audio/video subset to said first user.

3. The method of claim 2, further comprising:
receiving, by said computer processor from a second user accessing a second device, a command for enabling said modified audio/video data file, said second user differing from said first user, wherein said second user is associated with said social networking system;
retrieving, by said computer processor from said second device, a second user profile associated with said second user, second user profile differing from said first user profile;
second analyzing, by said computer processor, said second user profile with respect to said independent audio/video tags and said rule data; and
transmitting, by said computer processor to said second user via said second device in response to results of said second analyzing, a second audio/video subset of said audio/video subsets, wherein said second device presents said second audio/video subset to said second user, wherein said second audio/video subset differs from said first audio/video subset.

4. The method of claim 1, further comprising:
receiving, by said computer processor from a first user accessing a first device, a command for enabling said modified audio/video data file, wherein said first user is not associated with said social networking system;
retrieving, by said computer processor from said first device, a first user profile associated with said first user;
first analyzing, by said computer processor, said first user profile with respect to said independent audio/video tags and said rule data; and
transmitting, by said computer processor to said first user via said first device in response to results of said first analyzing, a message indicating that said first user is not authorized to receive any of said audio/video subsets.

5. The method of claim 1, further comprising:
receiving, by said computer processor from a first user accessing a first device, a command for sharing specified audio/video subsets of said audio/video subsets with social networking users of said social networking system;
retrieving, by said computer processor from said first device, a first user profile associated with said first user;
analyzing, by said computer processor, said first user profile with respect to said command, said independent audio/video tags, and said rule data; and
authorizing, by said computer processor to social networking system based on results of said analyzing said first user profile with respect to said command, said sharing of said specified audio/video subsets with said social networking users of said social networking system.

6. The method of claim 5, further comprising:
receiving, by said computer processor from a first social networking user of said social networking users, a request for viewing a listing of said independent audio/video tags; and
presenting, by said computer processor to said first social networking user in response to said request, said listing of said independent audio/video tags.

7. The method of claim 6, further comprising:
receiving, by said computer processor from said first social networking user in response to said presenting said listing of said independent audio/video tags, a first request for enabling a first independent audio/video tag of said independent audio/video tags; and
presenting, by said computer processor to said first social networking user in response to said first request, a first audio/video subset of said audio/video subsets.

8. The method of claim 6, further comprising:
receiving, by said computer processor from said first social networking user in response to said presenting said listing of said independent audio/video tags, a first request for enabling a first independent audio/video tag of said independent audio/video tags; and
transmitting, by said computer processor to said first social networking user in response to said first request, a first audio/video subset of said audio/video subsets.

9. The method of claim 5, wherein said authorizing said sharing of said specified audio/video subsets with said social networking users of said social networking system comprises sharing based on specified rules selected from the group consisting of person based sharing rules, location based sharing rules, time based sharing rules, publisher based sharing rules, and age group based sharing rules.

10. The method of claim 1, further comprising:
receiving, by said computer processor from a first user accessing a first device, a command for adding a first audio/video tag of said independent audio/video tags to an associated playlist, wherein said first user is associated with said social networking system;
retrieving, by said computer processor from said first device, a first user profile associated with said first user;
first analyzing, by said computer processor, said first user profile with respect to said independent audio/video tags and said rule data; and
adding, by said computer processor in response to results of said first analyzing, said first audio/video to said associated playlist.

11. The method of claim 1, further comprising:
receiving, by said computer processor from said first user, a command for enabling said modified audio/video data file; and
transmitting, by said computer processor to said first user via said first device, a first audio/video subset of said audio/video subsets and said first audio/video tag, wherein said first device presents said first audio/video subset and said first audio/video tag to said first user.

12. The method of claim 1, further comprising:
providing at least one support service for at least one of creating, integrating, hosting, maintaining, and deploying computer-readable code in said computing system, wherein the code in combination with the computing system is capable of performing: said receiving said audio/video data file, said receiving said tag data, said associating, said generating, said retrieving said rule data, and said storing.

13. A computer program product, comprising a computer readable hardware storage device storing a computer readable program, said computer readable program code comprising an algorithm that when executed by a computer processor of a computing system implements a method comprising:
receiving, by said computer processor, an audio/video data file;
receiving, by said computer processor, tag data describing different subject matter of audio/video data of said audio/video data file;
associating, by said computer processor, portions of said tag data with audio/video subsets of said audio/video data;
generating, by said computer processor, a modified audio/video data file comprising independent audio/video tags derived from said tag data, wherein each audio/video tag of said independent audio/video tags comprises an audio/video subset of said audio/video subsets independently stored with an associated portion of said portions of said tag data, and wherein each audio/video subset is associated with different subject matter of a single audio/video file of said audio/video data, wherein each said different subject matter comprises subject matter associated with comedy video subject matter, action video subject matter, romantic video subject matter, or drama video subject matter;
dividing, by said computer processor, each said audio/video tag into multiple sub tags, wherein each sub tag of said multiple sub tags comprises an associated portion of said independent audio/video tags;
receiving, by said computer processor, rule data comprising rules associated with allowing users of a social networking system to view each said audio/video subset, said rule data comprising time and date based rules and subject matter based rules;
associating, by said computer processor, said rule data with said independent audio/video tags;
storing, by said computer processor, said modified audio/video data file, said multiple sub tags, and said rule data;
determining, by said computer processor based on said rules, a schedule for sharing said independent audio/video tags with different users of said social networking system based on specified dates, specified time periods, and specified subject matter of each said different subject matter, wherein said specified dates comprise a set of dates occurring prior to a specified date and a set of dates occurring after said specified dates;
sharing, by said computer processor with said social networking system, specified audio/video tags of said independent audio/video tags and specified sub tags of said multiple sub tags;
receiving, by said computer processor from a user of said social networking system, a request for audio/video;
analyzing, by said computer processor, said rules with respect to said modified audio/video data file, said multiple sub tags, and said rule data;
analyzing, by said computer processor, said schedule; and
transmitting, by said computer processor to said user in response to results of said analyzing said rules and said analyzing said schedule, an audio/video subset of said audio/video subsets and a sub tag of said multiple sub tags.

14. The computer program product of claim 13, wherein said method further comprises:
receiving, by said computer processor from a first user accessing a first device, a command for enabling said modified audio/video data file, wherein said first user is associated with said social networking system;

retrieving, by said computer processor from said first device, a first user profile associated with said first user;

first analyzing, by said computer processor, said first user profile with respect to said independent audio/video tags and said rule data; and transmitting, by said computer processor to said first user via said first device in response to results of said first analyzing, a first audio/video subset of said audio/video subsets, wherein said first device presents said first audio/video subset to said first user.

15. The computer program product of claim 14, wherein said method further comprises:

receiving, by said computer processor from a second user accessing a second device, a command for enabling said modified audio/video data file, said second user differing from said first user, wherein said second user is associated with said social networking system;

retrieving, by said computer processor from said second device, a second user profile associated with said second user, second user profile differing from said first user profile;

second analyzing, by said computer processor, said second user profile with respect to said independent audio/video tags and said rule data; and transmitting, by said computer processor to said second user via said second device in response to results of said second analyzing, a second audio/video subset of said audio/video subsets, wherein said second device presents said second audio/video subset to said second user, wherein said second audio/video subset differs from said first audio/video subset.

16. The computer program product of claim 13, wherein said method further comprises:

receiving, by said computer processor from a first user accessing a first device, a command for enabling said modified audio/video data file, wherein said first user is not associated with said social networking system;

retrieving, by said computer processor from said first device, a first user profile associated with said first user;

first analyzing, by said computer processor, said first user profile with respect to said independent audio/video tags and said rule data; and transmitting, by said computer processor to said first user via said first device in response to results of said first analyzing, a message indicating that said first user is not authorized to receive any of said audio/video subsets.

17. The computer program product of claim 13, wherein said method further comprises:

receiving, by said computer processor from a first user accessing a first device, a command for sharing specified audio/video subsets of said audio/video subsets with social networking users of said social networking system;

retrieving, by said computer processor from said first device, a first user profile associated with said first user;

analyzing, by said computer processor, said first user profile with respect to said command, said independent audio/video tags, and said rule data; and authorizing, by said computer processor to social networking system based on results of said analyzing said first user profile with respect to said command, said sharing of said specified audio/video subsets with said social networking users of said social networking system.

18. The computer program product of claim 17, wherein said method further comprises:

receiving, by said computer processor from a first social networking user of said social networking users, a request for viewing a listing of said independent audio/video tags; and presenting, by said computer processor to said first social networking user in response to said request, said listing of said independent audio/video tags.

19. A computing system comprising a computer processor coupled to a computer-readable memory unit, said memory unit comprising instructions that when executed by the computer processor implements a method comprising:

receiving, by said computer processor, an audio/video data file;

receiving, by said computer processor, tag data describing different subject matter of audio/video data of said audio/video data file;

associating, by said computer processor, portions of said tag data with audio/video subsets of said audio/video data;

generating, by said computer processor, a modified audio/video data file comprising independent audio/video tags derived from said tag data, wherein each audio/video tag of said independent audio/video tags comprises an audio/video subset of said audio/video subsets independently stored with an associated portion of said portions of said tag data, and wherein each audio/video subset is associated with different subject matter of a single audio/video file of said audio/video data, wherein each said different subject matter comprises subject matter associated with comedy video subject matter, action video subject matter, romantic video subject matter, or drama video subject matter;

dividing, by said computer processor, each said audio/video tag into multiple sub tags, wherein each sub tag of said multiple sub tags comprises an associated portion of said independent audio/video tags;

receiving, by said computer processor, rule data comprising rules associated with allowing users of a social networking system to view each said audio/video subset, said rule data comprising time and date based rules and subject matter based rules;

associating, by said computer processor, said rule data with said independent audio/video tags;

storing, by said computer processor, said modified audio/video data file, said multiple sub tags, and said rule data;

determining, by said computer processor based on said rules, a schedule for sharing said independent audio/video tags with different users of said social networking system based on specified dates, specified time periods, and specified subject matter of each said different subject matter, wherein said specified dates comprise a set of dates occurring prior to a specified date and a set of dates occurring after said specified dates;

sharing, by said computer processor with said social networking system, specified audio/video tags of said independent audio/video tags and specified sub tags of said multiple sub tags;

receiving, by said computer processor from a user of said social networking system, a request for audio/video;

analyzing, by said computer processor, said rules with respect to said modified audio/video data file, said multiple sub tags, and said rule data;

analyzing, by said computer processor, said schedule; and transmitting, by said computer processor to said user in response to results of said analyzing said rules and said analyzing said schedule, an audio/video subset of said audio/video subsets and a sub tag of said multiple sub tags.

20. The computing system of claim 19, wherein said method further comprises:

receiving, by said computer processor from a first user accessing a first device, a command for enabling said modified audio/video data file, wherein said first user is associated with said social networking system;

retrieving, by said computer processor from said first device, a first user profile associated with said first user;

first analyzing, by said computer processor, said first user profile with respect to said independent audio/video tags and said rule data; and transmitting, by said computer processor to said first user via said first device in response to results of said first analyzing, a first audio/video subset of said audio/video subsets, wherein said first device presents said first audio/video subset to said first user.

\* \* \* \* \*